(12) United States Patent
Cimpu (10) Patent No.: US 12,003,972 B2
(45) Date of Patent: Jun. 4, 2024

(54) METHOD AND A NODE FOR ALLOCATING SPECTRUM EFFICIENTLY IN CLUSTERS OF NODES

(71) Applicants: TELEFONAKTIEBOLAGET LM ERICSSON (PUBL), Stockholm (SE); Virgil Cimpu, Ottawa (CA)

(72) Inventor: Virgil Cimpu, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 572 days.

(21) Appl. No.: 17/270,634

(22) PCT Filed: Aug. 27, 2019

(86) PCT No.: PCT/IB2019/057221
§ 371 (c)(1),
(2) Date: Feb. 23, 2021

(87) PCT Pub. No.: WO2020/044243
PCT Pub. Date: Mar. 5, 2020

(65) Prior Publication Data
US 2021/0345121 A1 Nov. 4, 2021

Related U.S. Application Data

(60) Provisional application No. 62/723,160, filed on Aug. 27, 2018.

(51) Int. Cl.
*H04W 16/10* (2009.01)
*H04W 16/14* (2009.01)
(Continued)

(52) U.S. Cl.
CPC ........... *H04W 16/10* (2013.01); *H04W 16/14* (2013.01); *H04W 28/16* (2013.01); *H04W 72/0453* (2013.01); *H04W 72/541* (2023.01)

(58) Field of Classification Search
CPC ... H04W 16/10; H04W 72/541; H04W 16/14; H04W 28/19; H04W 72/0453;
(Continued)

(56) References Cited

U.S. PATENT DOCUMENTS

2021/0329671 A1* 10/2021 Kim ................. H04W 72/0453
2021/0400696 A1* 12/2021 Maki .................... H04L 5/0051
2022/0360387 A1* 11/2022 Bai ....................... H04L 5/0051

FOREIGN PATENT DOCUMENTS

WO         2018150303 A1   8/2018
WO    WO-2018150303 A1 *  8/2018   ............ H04W 16/02

OTHER PUBLICATIONS

NPL Document, "SAS-assisted Coexistence-Aware Dynamic Channel Assignment in CBRS band" NY, May 16, 2018. (Year: 2018).*
(Continued)

*Primary Examiner* — Mewale A Ambaye
(74) *Attorney, Agent, or Firm* — Ericsson Inc.

(57) ABSTRACT

There is provided a method in a controlling node to efficiently assign spectrum to nodes representing wireless base stations which are using/sharing the same block of spectrum. The nodes are organized in a graph where connections between nodes represent potential of interference. The nodes are grouped based on the ability to handle mutual interference. The method includes: determining recursively a plurality of clusters of nodes of increasing sizes; and assigning a bandwidth to nodes in each cluster, based on the size of the cluster. By so doing, the spectrum allocation can be optimized, allowing each node access to an increased amount of spectrum.

9 Claims, 10 Drawing Sheets

(51) Int. Cl.
  *H04W 28/16* (2009.01)
  *H04W 72/0453* (2023.01)
  *H04W 72/541* (2023.01)
(58) Field of Classification Search
  CPC ... H04W 72/082; H04W 16/02; H04W 72/08;
                     H04W 72/04; H04W 72/54
  See application file for complete search history.

(56) References Cited

OTHER PUBLICATIONS

Xuhang Ying, et al., "SAS-Assisted Coexistence-Aware Dynamic Channel Assignment in CBRS Band", Cornell University Library, May 16, 2018, pp. 1-14.
International Search Report and Written Opinion from corresponding PCT Application PCT/IB2019/057221.

* cited by examiner

METHOD AND A NODE FOR ALLOCATING SPECTRUM EFFICIENTLY IN CLUSTERS OF NODES

RELATED APPLICATIONS

The present application claims the benefits of priority of U.S. Provisional Patent Application No. 62/723,160, entitled "A Method and a Node for allocating spectrum" and filed at the United States Patent and Trademark Office on Aug. 27, 2018, the content of which is incorporated herein by reference.

TECHNICAL FIELD

The present description generally relates to methods and apparatus for coexistence management in shared spectrum scenarios.

BACKGROUND

The advance of mobile cellular networks and the popularity of mobile devices combined with the constant growth in user throughput have created a huge demand for one resource: spectrum.

There are three main approaches on spectrum management:

License the spectrum to operators, who will pay significant fees for the privilege of using dedicated spectrum;

Unlicensed spectrum where devices are sharing the same spectrum using a set of predetermined rules aimed at insuring fair spectrum access; and Shared spectrum, e.g., Licensed Shared Access (LSA) or Authorized shared access (ASA), usually proposing a division of rights of use, based on time of use or geographical constraints between mobile operators and possibly an incumbent user.

This disclosure is concerned with the third (last) approach, which proposes a shared spectrum approach. A typical use of this scenario is to enable use of a band that is available for licensed users in some markets, but is being restricted in others because of incumbents, such as radar or satellite systems. Incumbent systems can be protected around the area of deployment, while authorization for mobile infrastructure can be granted in such a way that aggregate interference from mobile systems towards the incumbent is limited to an acceptable level of noise rise or performance degradation. In LSA, the mobile operator is licensed to operate in permitted or authorized areas, and is the reasonable regulatory approach to ASA.

The introduction of Licensed Shared Access (LSA) in the 2.3 GHz band will allow binary sharing between the incumbent, namely terrestrial radar stations in e.g. France, and LTE with the aid of a spectrum repository known as the LSA repository. Such regulation aims at unlocking spectrum designated as an International Mobile Telecommunications (IMT) band in the International Telecommunications Union (ITU) in markets, and subsequently offered a band designation in 3GPP, namely Band 40.

The creation in USA of the new Citizens Broadband Radio Service (CBRS) in the 3.5 GHz band, currently occupied by incumbents like the Department of Defense, will add much-needed capacity to meet the ever-increasing demands of wireless innovation. The CBRS represents a more aggressive application of ASA to spectrum, where in addition to long-term geographic licenses shared with incumbents, multiple operators may also coexist in close geographical proximity to one another.

Sharing in the 3.5 GHz band occurs between three tiers of users, with higher tiers being accorded lower priority. Access to the spectrum is governed by a Spectrum Access System (SAS) that implements a geolocation database and policy management function to be used to protect incumbents as well as implement a tiered access framework. Incumbent users represent the highest tier in this framework and receive interference protection from Citizens Broadband Radio Service users. Protected incumbents include the federal operations described above, as well as Fixed Satellite Service (FSS) and, for a finite period, grandfathered terrestrial wireless operations in the 3650-3700 MHz portion of the band. The Citizens Broadband Radio Service itself consists of two tiers—Priority Access and General Authorized Access (GAA)—both authorized in any given location and frequency by an SAS. As the name suggests, Priority Access operations receive protection from GAA operations. Priority Access Licenses (PALs), defined as an authorization to use a 10 megahertz channel in a single census tract for three years or longer, will be assigned in up to 70 megahertz of the 3550-3650 MHz portion of the band. GAA use will be allowed, by rule, throughout the 150 megahertz band. GAA users will receive no interference protection from other Citizens Broadband Radio Service users. The band has been designed for deployment of small cells, although there is sufficient capability in the rules to provision wide area macro deployments as well.

Figure 1:
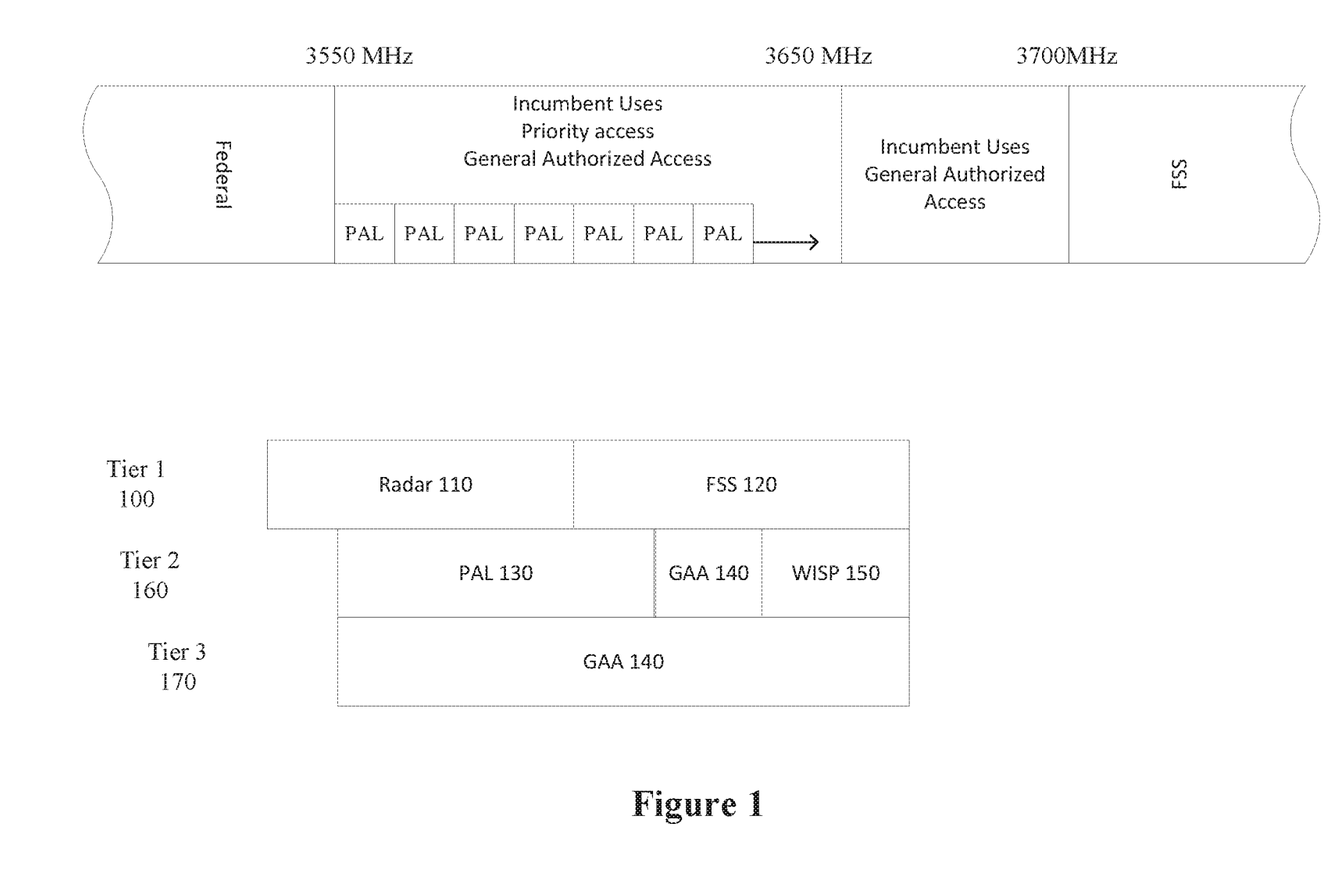
FIG. 1 illustrates the spectrum anatomy for the 3.5 GHz Citizens Broadband Radio Service.

FIG. 1 illustrates the spectrum anatomy for the 3.5 GHz Citizens Broadband Radio Service. As can be seen in FIG. 1, the incumbent users of the first tier 100 are the radar users 110 and FSS users 120, for example. PAL users 130, GAA users 140 and WISPA (Wireless Internet Service Providers Association) users 150 constitute the second tier 160. GAA users 140 also constitute the third tier 170.

A Citizens Broadband radio Service Device (CBSD) will first register with the SAS and provide its location information among other registration parameters, and then it will ask the SAS to grant access in a certain channel. Before granting access, the SAS will use information from the Environmental Sensing Capability (ESC) network to detect incumbent activity in the area where the CBSD operates. The SAS will also use measurement reports from the other CBSDs in the same area to determine the level of interference in a certain channel as well as if the channel needs to be protected due to PAL user activity.

SUMMARY

The introduction of a centralized Spectrum Access System (SAS) in the CBRS band, opens the possibility of introducing new coexistence algorithms that are technology neutral. It has been decided that the SAS would assign or allocate bandwidth to the CBSDs or nodes.

A coloring algorithm has been used to determine the assignment of bandwidth to the nodes to prevent the nodes from interfering with each other. The CBSDs are represented by nodes in a connected set where the connections represent the interference between CBSDs. Two nodes that are connected must use different colors, in order to avoid interference. The colors allow to determine the number of necessary channels (i.e. frequency bandwidths) to be assigned to the nodes. This algorithm can also be applied to co-existence groups (CxGs) instead of nodes.

However, the current algorithm is not optimal.

Certain aspects and their embodiments of the present disclosure may provide solutions for an optimized method to assign bandwidths to CBSDs, by taking into consideration CxGs membership and the connections between nodes.

For example, some embodiments allow to determine recursively a plurality of clusters of nodes based on nodes membership to an increasing number of groups (e.g. CxGs), where the connections between nodes are contained only between those CxGs and assigning a bandwidth for the nodes in each cluster, based on the size of the cluster which is represented by the number of CxGs in the cluster.

According to one aspect, some embodiments include a method performed by a controlling node. The method comprises: determining recursively a plurality of clusters of nodes of increasing size; and assigning a bandwidth to each cluster, based on the size of the cluster.

According to another aspect, some embodiments include a controlling node configured, or operable, to perform one or more functionalities (e.g. actions, operations, steps, etc.) as described herein. For example, it can perform the above method.

In some embodiments, the controlling node may comprise one or more communication interfaces configured to communicate with one or more network nodes, and processing circuitry operatively connected to the communication interface, the processing circuitry being configured to perform one or more functionalities as described herein.

In some embodiments, the processing circuitry may comprise at least one processor and at least one memory storing instructions which, upon being executed by the processor, configure the at least one processor to perform one or more functionalities as described herein.

In some embodiments, the controlling node may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the controlling node, configure the processing circuitry to perform one or more functionalities as described herein.

The embodiments provide the advantages/benefits that the spectrum allocation can be optimized, allowing each node access to an increased amount of spectrum.

It is to be noted that any feature of any of the embodiments disclosed herein may be applied to any other embodiment, wherever appropriate. Likewise, any advantage of any of the embodiments may apply to the other embodiments, and vice versa. Certain embodiments may have some, or none of the above advantages. Other advantages will be apparent to persons of ordinary skill in the art. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which:

FIGS. 4a) and b) illustrate an example of a connected set in which the method of FIG. 3 is applied, according to an embodiment.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

Various features and embodiments will now be described with reference to the figures to fully convey the scope of the disclosure to those skilled in the art.

Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer readable carrier or carrier wave containing an appropriate set of computer instructions that would cause a processor to carry out the techniques described herein.

In some alternate embodiments, the functions/actions may occur out of the order noted in the sequence of actions. Furthermore, in some illustrations, some blocks, functions or actions may be optional and may or may not be executed; these are generally illustrated with dashed lines.

Figure 2:
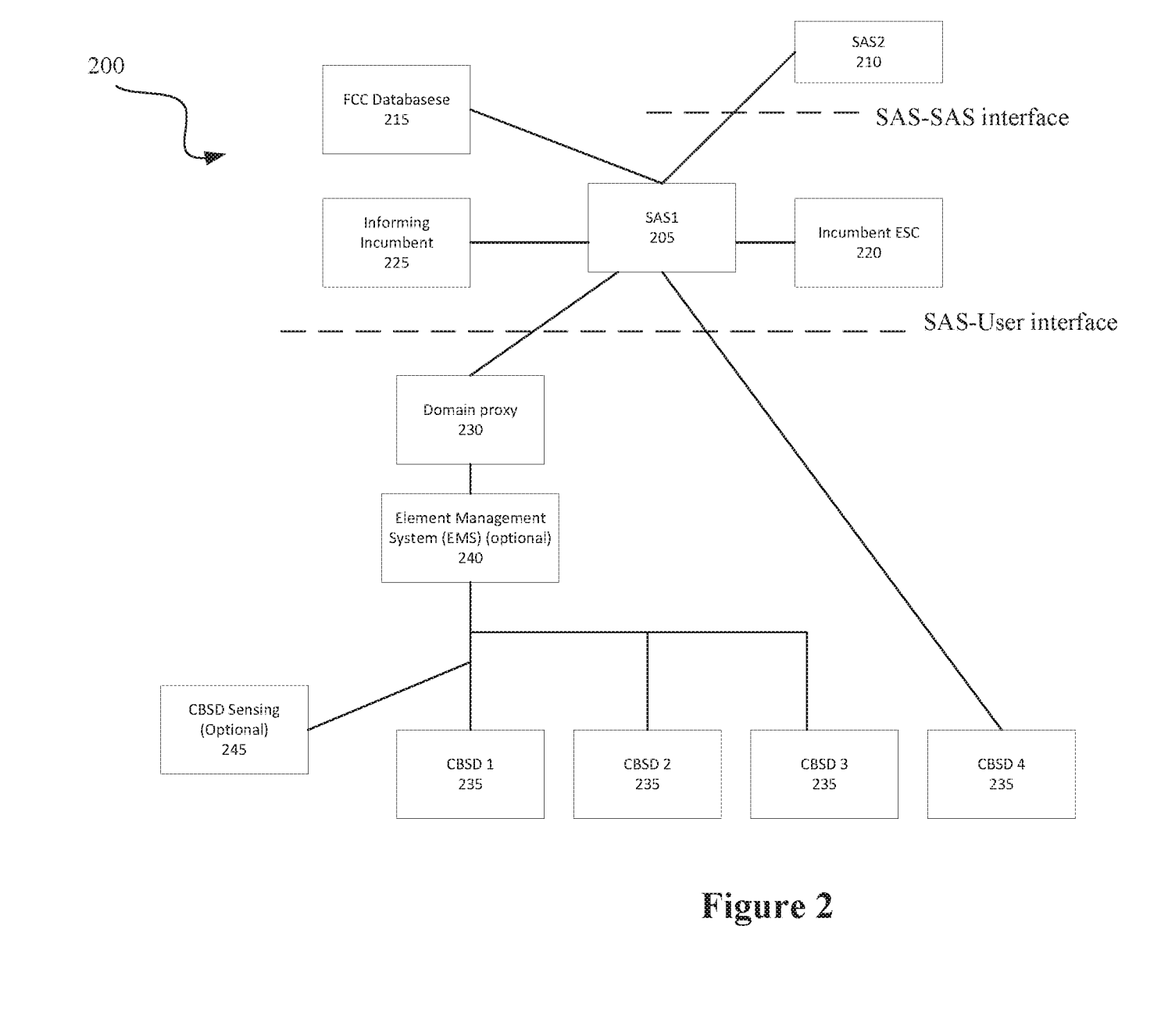
FIG. 2 illustrates the SAS architecture.

The SAS Architecture 200 is depicted in FIG. 2, as proposed by the Federal Communications Commission (FCC) for the 3.5 GHz band. The SAS is a central entity or system for coordinating, authorizing and managing use of the CBRS spectrum, protecting higher tier operations from interference, and maximizing frequency capacity for all CBRS operators. The SAS may be referred to as a controlling node. The SAS administrators will be permitted to charge CBRS operators fees for registration and frequency coordination services. There may be one or more SAS, such as SAS1 205 and SAS2 210 connected to each other.

As illustrated in FIG. 2, for example, SAS1 205 is also connected to FCC databases 215, an Environmental Sensing Capability (ESC) system 220 for incumbent detection, an informing incumbent system 225, a domain proxy 230 and CBSDs 235 (e.g. CBSD4). The Domain Proxy 230 can be optionally connected to an Element Management System (EMS) 240. The EMS 240 can be connected to a plurality of CBSDs 235, such as CBSD1, CBSD2, CBSD3, etc. Each CBSD domain may optionally include some sensing capability systems (e.g. CBSD sensing).

The FCC requires that transmission equipment with specific, standardized capabilities be employed by CBRS operators for use in the 3.5 GHz band. This equipment is called Citizens Broadband Service Device ("CBSD"). CBSDs are fixed base stations/access points, such as an LTE Evolved Universal Terrestrial Radio Access Network (E-UTRAN) Node Bs (also commonly denoted as evolved Node Bs, enhanced Node Bs, eNodeBs, or eNBs). There are two types of CBDSs: Category A (a lower power CBSD) and Category B (a higher power CBSD). The CBSDs can only operate under the authority and management of a centralized Spectrum Access System.

CBRS end user devices are controlled by an authorized CBSD. End User Devices (EUD) have the capability to receive and decode information from a CBSD. The users access a communication network through one or more CBSDs and, when granted permission from the SAS, use resources within the shared band.

Some of the SAS' functionalities are as follows:
Determine and provide to CBSDs the permissible channels or frequencies at their location.
Determine and provide to CBSDs the maximum permissible transmission power level at their location.
Communicate with the ESC to obtain information about federal Incumbent User transmissions and instruct CBSDs to move to another frequency range or cease transmissions.
Ensure that CBSDs operate in geographic areas and within the maximum power levels required to protect federal Incumbent Users from harmful interference.
Register and authenticate the identification information and location of CBSDs.
Ensure that CBSDs protect non-federal Incumbent Users from harmful interference.
Protect Priority Access Licensees from interference caused by other PALs and from General Authorized Access Users.
Facilitate coordination between GAA users operating Category B CBSDs.
Resolve conflicting uses of the band while maintaining, as much as possible, a stable radio frequency environment.
Ensure secure and reliable transmission of information between the SAS and CBSDs.
Protect Grandfathered Wireless Broadband Licensees.
Implement the terms of current and future international agreements as they relate to the Citizens Broadband Radio Service.

The ESC 220 monitors for incumbent radar activity in coastal areas and near inland military bases. For example, the ESC 220 can employ spectrum sensing technologies in conjunction with the SAS, in order to allow CBRS users to operate near coastlines on frequencies not being used by the federal radar systems. When incumbent activity is detected, the ESC 220 communicates that information to SAS1 205. The SAS or SASs will reconfigure local devices to avoid interfering with the detected incumbent radars.

The FCC databases 215 include information related to commercial users and corresponding licenses (e.g., site-based licensing information). SAS1 205 and SAS2 210 are capable of directly interfacing with the FCC databases 215 to access information used for SAS operations.

The Domain Proxy 230 is a managing intermediary. A Domain Proxy's function is to, for example:
Accept a set of one or more available channels and select channels for use by specific CBSDs, or alternatively pass the available channels to the carrier EMS for CBSD channel selection;
EMS may optionally be co-located with the domain proxy;
Back report selected channels to SAS optionally received via EMS;
Receives confirmation of channel assignment from SAS;
Performs bidirectional bulk CBSD registration and directive processing, optionally through carrier EMS if present;
Perform bidirectional information processing and routing;
E.g. interference reporting, etc.

There is a need to ensure co-existence in the GAA deployment. However, the problem of interference should be addressed. For example, a certain area in a city may have different operators deploying their network through CBSDs, for example. Then, the SAS needs to decide how to allocate the spectrum to CBSDs without interfering with each other.

To do so, the SAS can represent each CBSD or each eNB as a node in a graph and represent a connection between two nodes if the two nodes have a potential to interfere with each other. For example, if two eNBs have an overlap coverage, then the SAS will draw a line between the 2 nodes. The connection represents a potential interference.

By building such a graph, the SAS can figure out how to assign different frequencies to CBSDs so that the CBSDs don't interfere with each other. A classic algorithm for building the graph is the graph coloring algorithm. This algorithm assigns different colors to different nodes (e.g. eNB/gNBs) so that two nodes that are connected to each other don't have the same color. Then, the SAS can determine how many colors are needed to color the graph, it can assign a frequency range to each color and assign a color to each CBSD so that it is guaranteed that the nodes do not interfere with each other (no two connected nodes have the same color and same frequency).

However, an operator may deploy multiple nodes. Those nodes may interfere with each other but this is not a problem because the operator can manage the interference of the nodes by maintaining a list of Physical Cell Identity (PCI), for example. As such, the nodes can co-exist even though they may interfere with each other.

A co-existence group (CxG) is defined as a group of nodes that may have interference with each other, but the CxG can take care of its own interference. In the presence of CxGs, the SAS creates a sub-set graph for each CxG and extracts the nodes that belong to the CxG and color each CxG sub-graph separately with a certain number of colors. Then, the SAS adds all the colors up (from all the sub-graphs) and decides how to assign the frequencies to a CxG. In this case, the SAS does assign frequencies to each CxG, but not to each node (i.e. the nodes are ignored since it is assumed that the CxG will manage the interference between the nodes belonging to the CxG, for example by using the service of the Coexistence Manager (CxM)).

Embodiments of the present disclosure address the problem of how to assign frequencies to CxGs and to nodes as well. As such, the nodes are not ignored.

Figure 3:
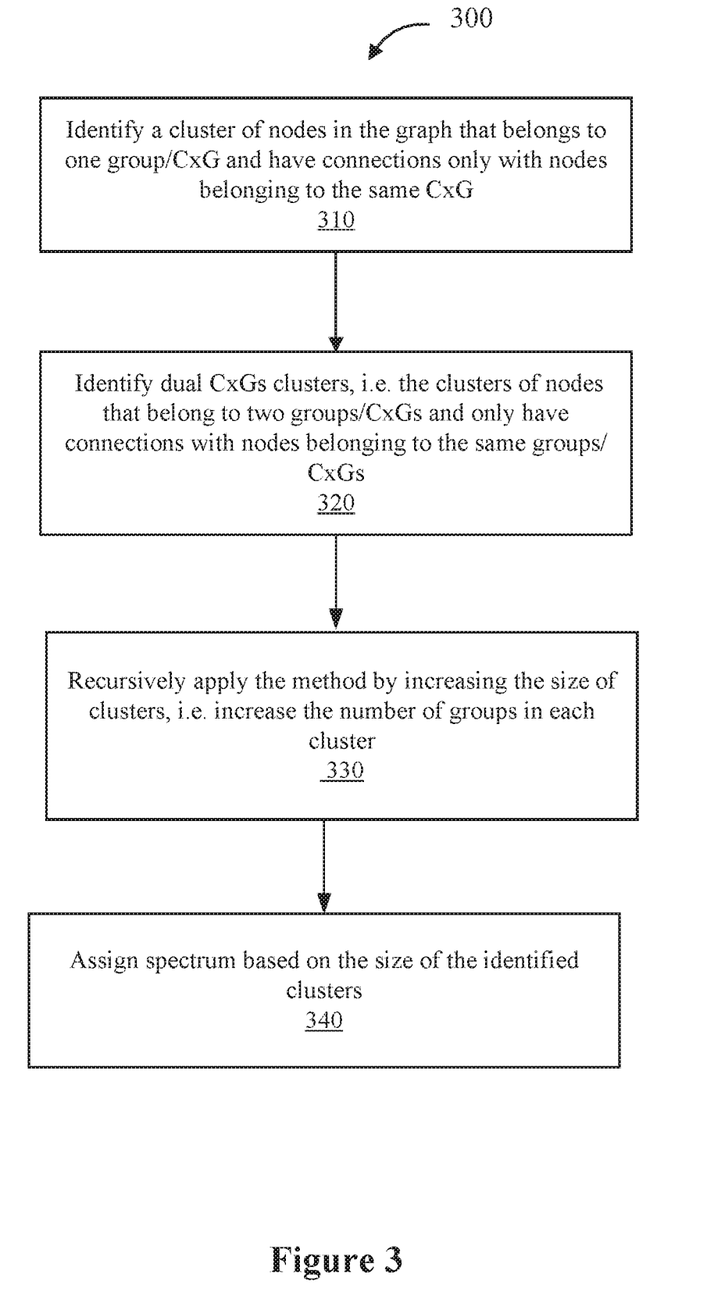
FIG. 3 illustrates a flow chart of a method for allocating spectrum, according to an embodiment.

Turning to FIG. 3, a method of assigning spectrum (e.g. frequencies) to a plurality of nodes in a SAS architecture of FIG. 2 will be described. This method can be referred to as the recursive clustering method. This method allows to increase efficiency of spectrum allocation to CxGs. Generally stated, the method allows to identify clusters of nodes in a connected set (representing the nodes and their connections in a coverage area) that only have connections to nodes that belong to a subset of CxGs.

For example, step 310 identifies a cluster of nodes in the graph that belong to one group or CxG (referred to as $CxG_x$) and only have connections with nodes of the graph that also belong to the same $CxG_x$. This cluster is considered to be of size 1. For those clusters of nodes, the entire 100% of the GAA spectrum can be allocated to each node in the clusters. When required, it will be up to the CxM to further divide the spectrum within the CxG (aka intra-CxG spectrum assignment), as mentioned earlier.

The method can be applied recursively by increasing the number of CxGs that are part of the cluster. For example, after identifying all the single CxG clusters, the next step (step 320) would be to identify the dual CxG clusters, i.e. the clusters of nodes that belong to two groups/CxGs, such as $CxG_x$ and $CxG_y$, and only have connections with nodes belonging to the same two groups, i.e. $CxG_x$ and $CxG_y$. These clusters are considered to be of size 2.

The size of the clusters indicates the number of CxGs that the nodes belong to. The nodes in the clusters identified in step 320 can be allocated 50% of the GAA spectrum for nodes belonging to $CxG_x$ and 50% for nodes belonging to $CxG_y$.

In step 330, the method is applied recursively by increasing the size of clusters (e.g. 3, 4, etc.), i.e. increasing the number of groups in each cluster. In other words, step 330 identifies nodes that are connected to nodes from 3 different CxGs, then 4 different CxGs, etc., until all the nodes in the connected set are accounted for.

A special consideration can be given to the "link nodes", i.e. the nodes that connect these identified clusters with nodes belonging to CxGs that are not part of the identified clusters.

In step 340, the SAS assigns the spectrum based on the size of the identified clusters of CxGs.

For example, in general, if there are N CxGs in the connected set, then the clusters can be identified recursively, starting with single CxG clusters (k=1) for which 100% of spectrum can be allocated to the nodes in the cluster, up to clusters of size k=N, for which $$\frac{100\%}{k}$$

can be allocated to the nodes belonging to the clusters of size k.

The order of the steps is not necessarily in the described order. For example, step 340 can be performed after each identification step (e.g. step 310, 320 or 330).

It should be noted that the spectrum assignment to the individual nodes inside a CxG can be delegated to a Coexistence Manager (CxM) for that particular CxG.

Figure 4:
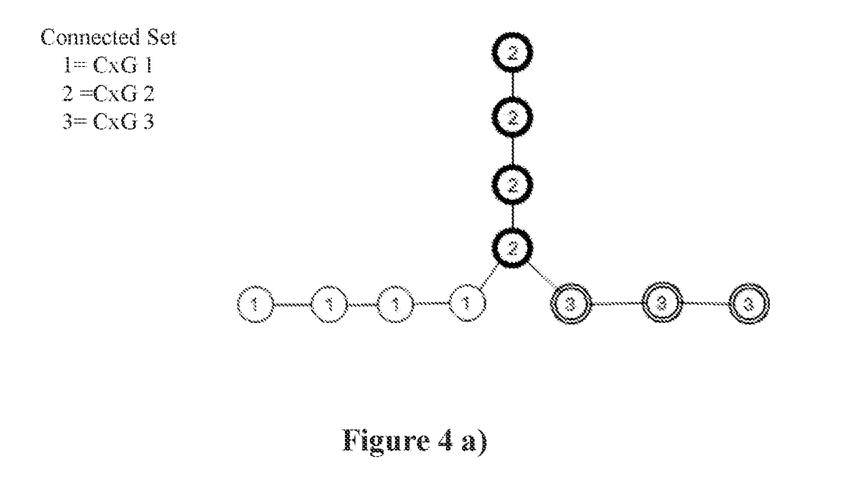

FIG. 4 illustrates an example in which the method 300 can be applied.

For example, the graph of a connected set as shown in FIGS. 4a) and b) has 3 different CxGs, for example, CxG1 which comprises 4 nodes labeled 1, CxG2 which comprises 4 nodes labeled 2, and CxG3 which comprises 3 nodes labeled 3.

The connected set could represent a small town, in which CxG1 is deployed on a first street, a neighbor CxG2 is deployed on a second street and another CxG3 is deployed on a third street.

Applying method 300 (as illustrated in FIG. 4b), first, find clusters of nodes that only have connections with nodes from the same CxG (step 310). As such, 3 clusters of nodes can be found. They are identified as:

C1, with nodes which belong to CxG1 and have connections with nodes within the same CxG1 (e.g. all the nodes labeled 1 except node 500);

C2 with nodes which belong to CxG2 and have connections with nodes within the same CxG2 (e.g. all the nodes labeled 2 except node 520);

C3, with nodes which belong to CxG3 and have connections with nodes within the same CxG3 (e.g. all the nodes labeled 3, except node 510).

For those nodes, the SAS can assign 100% of the GAA spectrum (step 340). The respective CxM of each CxG can manage the particular spectrum assignment within their nodes.

For the link nodes 500, 510 and 520, they form a cluster with 3 CxGs. As such, the SAS can give each node 33% (one third) of the GAA spectrum.

Alternatively, the SAS could further optimize the spectrum allocation for the cluster of nodes 500, 510 and 520 by doing a coloring of the clusters—in this case 2 colors are needed for the cluster, for example, node 500 can have a first color and node 520 can have a second color. Then, the node 510 can have the first color as well since there is no connection between nodes 500 and 510. Since 2 colors are needed in this case, the spectrum allocation becomes 100%/(number of colors)=50%. Therefore, following this spectrum allocation scheme, the SAS could assign 50% (half) of the spectrum to each node according to the assigned color.

It should be noted that method 300 improves the spectrum assignment compared to the current systems, in which all the nodes labeled 1 will form a first cluster, all the nodes labeled 2 will form a second cluster and all the nodes labeled 3 will form a third cluster. As such, all the nodes will be given 33% of the GAA spectrum according to the current systems.

Figure 5:
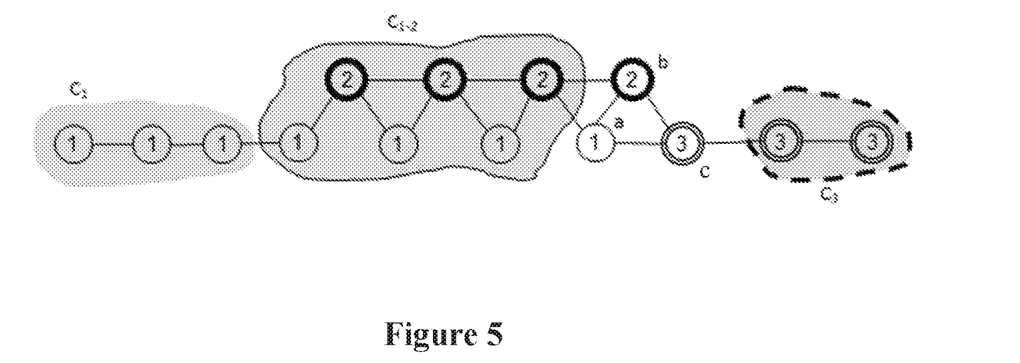
FIG. 5 illustrates an example of a connected set in which the method of FIG. 3 is applied, according to an embodiment.

FIG. 5 shows another example in which method 300 can be applied.

FIG. 5 illustrates a connected set in which CxG1 is deployed in one section of a town (for example), CxG3 is deployed in another section of the town, and Cx1 and Cx2 are deployed in a third section. CxG1, CxG2 and CxG3 can correspond to different operators using different technologies for example. Furthermore, the available GAA spectrum is 150 MHz (see FIG. 1).

Step 310: Find clusters of nodes that only have connections with nodes from the same CxG.

Here are the identified clusters for step 310: Cluster $C_1$ with nodes which belong to $CxG_1$ and Cluster $C_3$ with nodes which belong to CxG3.

Step 340: Give the nodes from these clusters access to 100% of the GAA spectrum (e.g. 0 MHz-150 MHz).

Step 320: Find clusters of nodes that only have connections with nodes from two CxGs.

Here are the identified Clusters for step 320: Cluster $C_{1-2}$ with nodes which belong to $CxG_1$ and $CxG_2$.

Step 340: Give the nodes from these clusters access to 50% of the GAA spectrum, according to their membership in $CxG_1$ or $CxG_2$. For example, the 3 nodes belonging to CxG1 (labelled as 1) can be assigned the spectrum or bandwidth of (0 MHz-75 MHz) and the 3 nodes belonging to CxG2 (labelled as 2) can be assigned the spectrum of (75 MHz-150 MHz).

Step 330: The remaining three link nodes (a, b and c) belong to a cluster with 3 CxGs.

Step 340: Give each node 33% of the GAA spectrum.

Furthermore, the SAS can also make sure that the spectrum assigned to node "a" overlaps with spectrum assigned to $CxG_1$ within the $C_{1-2}$ cluster, and spectrum assigned to node "b" overlaps with $CxG_2$ spectrum within $C_{1-2}$ cluster. For example, the node "a" can be assigned (0 MHz-50 MHz); node "b" can be assigned (100 MHz-150 MHz) and node "c" can be assigned (50 MHz-100 MHz).

Figure 6A:
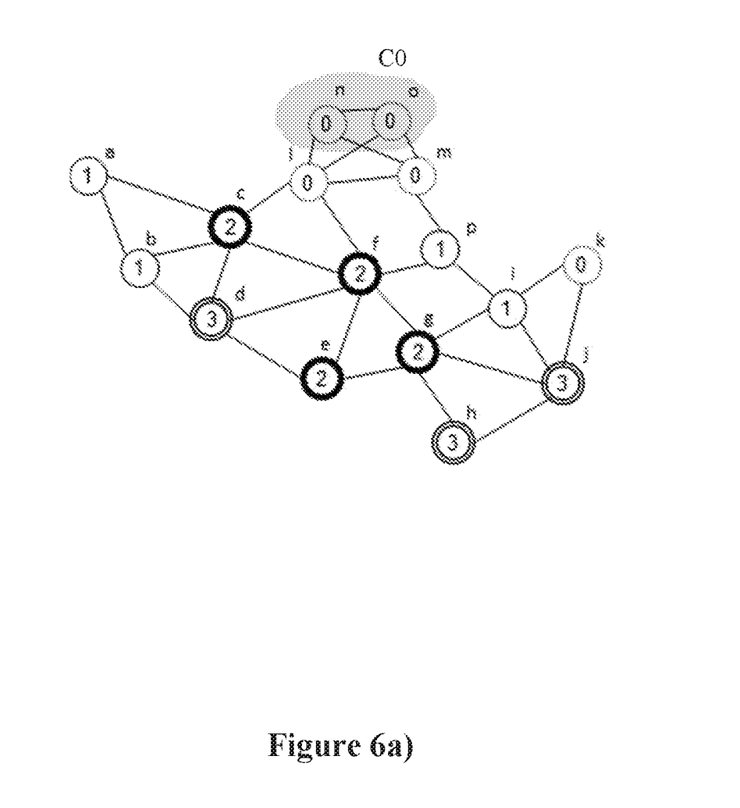
FIGS. 6a) to 6e) illustrate an example of a connected set in which the method of FIG. 3 is applied, according to an embodiment.

FIGS. 6a) to f) illustrate an example in which method 300 can be applied.

The connected set in FIG. 6a) is a more complex example.

Step 310: Find clusters of nodes that only have connections with nodes from the same CxG.

One cluster is identified as $C_0$ with nodes n and o which belong to $CxG_0$.

Step 340: Give these 2 nodes from the cluster access to 100% of the spectrum.

Figure 6B:
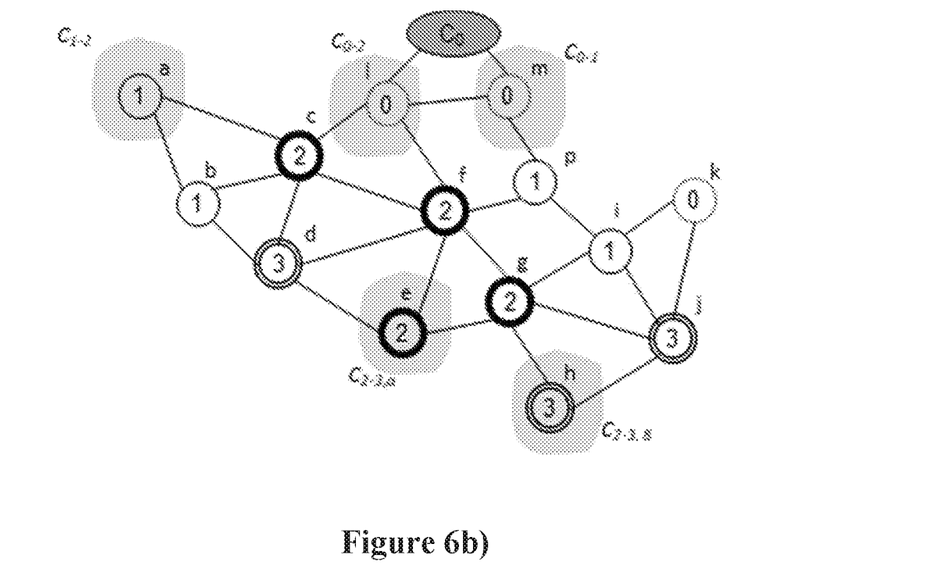
Figure 6C:
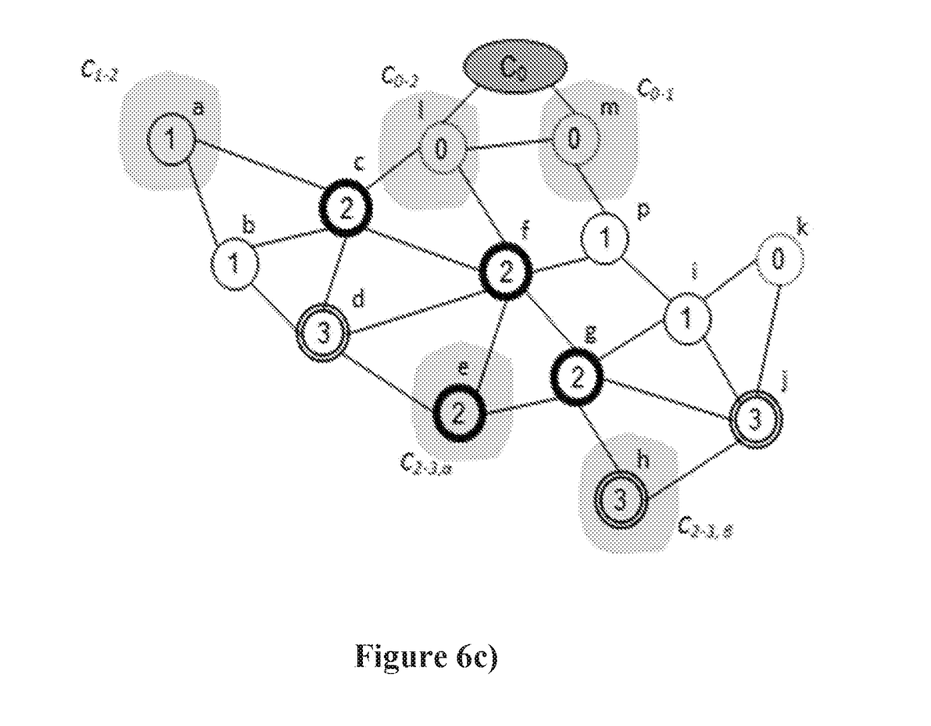

Step 320: Find clusters of nodes that only have connections with nodes from 2 CxGs:

The identified clusters from step 320 are (see FIG. 6b):
Cluster $C_{1-2}$ with nodes a
Cluster $C_{2-3,\alpha}$ with nodes e and $C_{2-3,\beta}$ with nodes h
Cluster $C_{0-1}$ with nodes m
Cluster $C_{0-2}$ with nodes l Step 340: Give each CxG in these clusters 50% of spectrum.

Step 330: Find clusters of nodes that only have connections with nodes from 3 CxGs The identified clusters from step 330 are (see FIG. 6c):
Cluster $C_{1-2-3,\alpha}$ with nodes b and d
Cluster $C_{1-2-3,\beta}$ with nodes g
Cluster $C_{0-1-2}$ with nodes p
Cluster $C_{0-1-3}$ with nodes k Step 340: Give each CxG in these clusters 33% of spectrum.

Figure 6D:
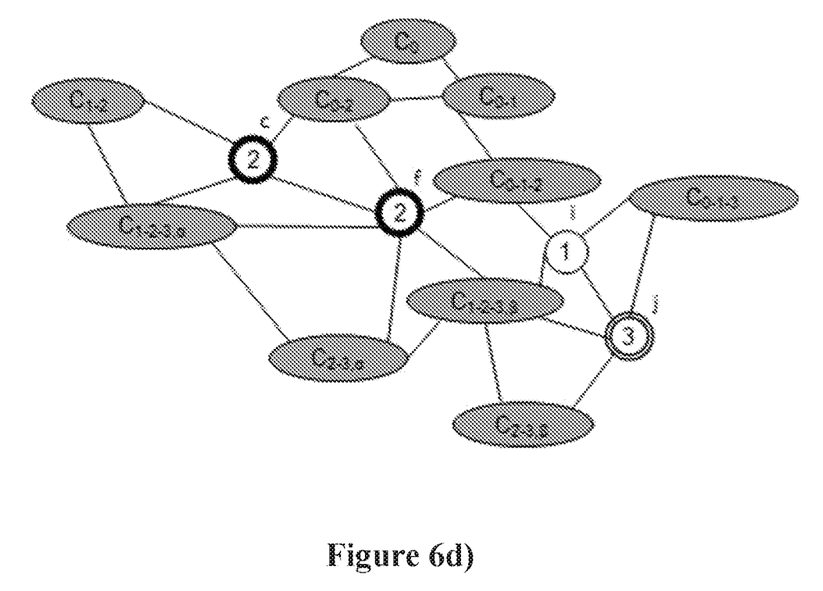

FIG. 6d) shows the rest of the nodes (c, f, i, j), which belong to clusters with 4 CxGs. The clusters are identified by recursively applying step 330 and increasing the size of the clusters.

Step 340: give 25% of the spectrum to these nodes, according to the number of CxG membership.

Figure 6E:
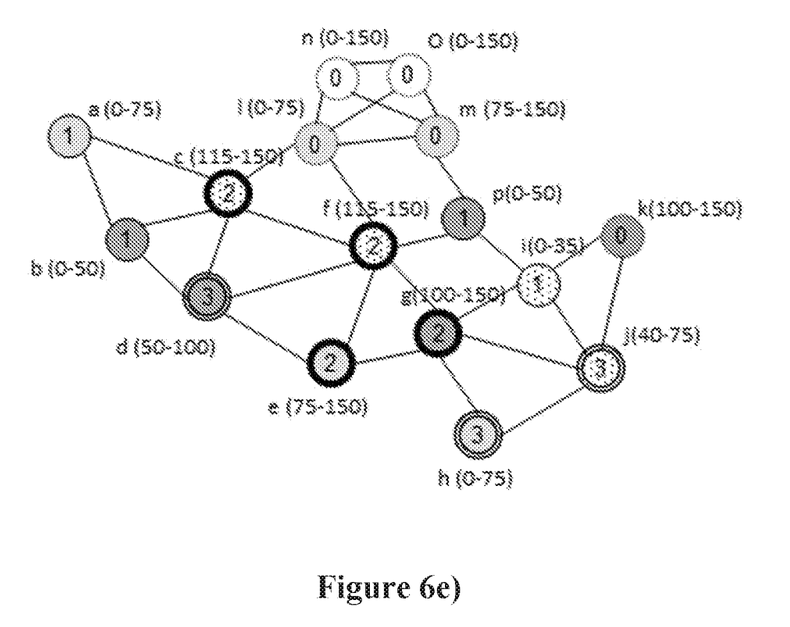

FIG. 6e) shows the final result of applying the method 300 in this example. If it is assumed that the GAA has 150 MHz of available spectrum, then the nodes "n" and "o" get 100% of the spectrum (150 MHz). The nodes "a", "l", "e", "m" and "h" get 50% of the spectrum (75 MHz). For example, nodes "a", "h" and "l" can get the frequency of 0 to 75 MHz, and nodes "m" and "e" can get the frequency of 75 MHz to 150 MHz.

The nodes "b", "d"", "p", "k" and "g" get 33% of the spectrum (50 MHz). For example, nodes "b" and "p" get frequencies 0 to 50 MHz, node "d" gets frequencies 50 to 100 MHz and nodes "k" and "g" get frequencies of 100 to 150 MHz.

The nodes "c", "f", "I" and "j" get 25% of the spectrum (35 MHz). For example, nodes "c" and "f" get frequencies from 115 to 150 MHZ and node "i" gets 0 to 35 MHz and node "j" gets frequencies 40 to 75 MHz.

Figure 7A:
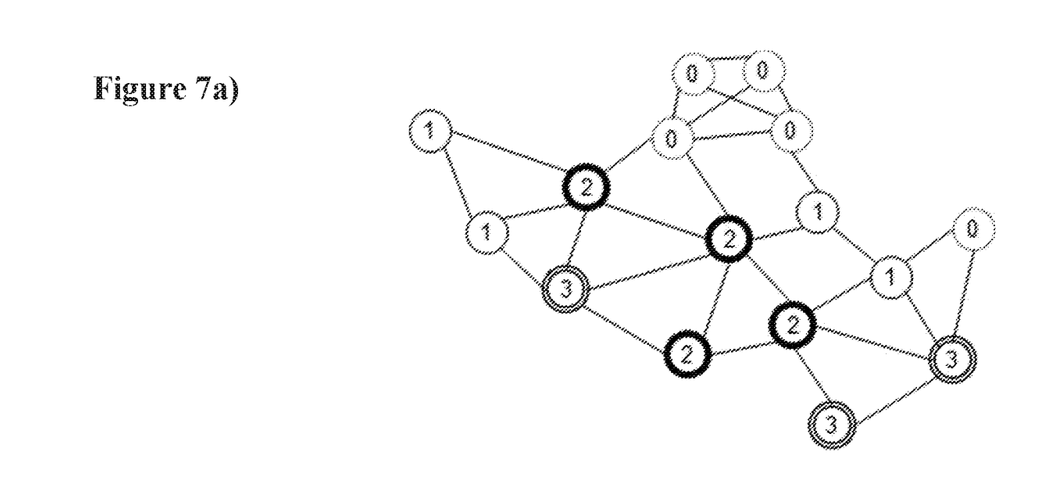
FIG. 7a) and b) illustrate an example of a connected set based on a classic method of coloring for allocating spectrum.
Figure 7B:
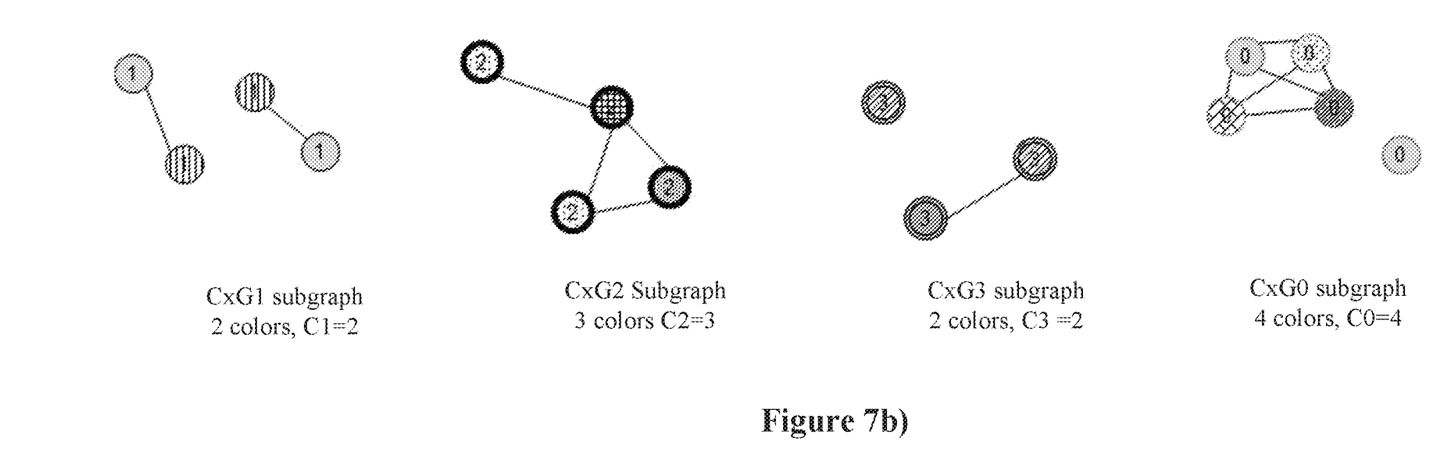

FIGS. 7a) and 7b) show the current/classic method of allocating spectrum. In FIG. 7b), the subgraphs of the CxGs are created. Then for each sub-graph, the number of colors is determined. In FIG. 7b), the colors are represented as different shades or background patterns. For example, for CxG1, there needs 2 colors (C1=2), for CxG2, there needs 3 colors (C2=3), for CxG3, there needs 2 colors (C3=2) and for CxG0, there needs 4 colors (C0=4).

Then, using the example of a GAA available spectrum of 150 MHz, the SAS will allocate the bandwidth (or different frequencies) to the different CxGs as follows, with C=2+3+2+4=11 (sum of chromatic numbers or sum of the number of colors):

$$BW_1 = B\frac{C_1}{C} = 150\frac{2}{11} = 25 \text{ MHz}$$

$$BW_2 = B\frac{C_2}{C} = 150\frac{3}{11} = 40 \text{ MHz}$$

$$BW_3 = B\frac{C_3}{C} = 150\frac{2}{11} = 25 \text{ MHz}$$

$$BW_0 = B\frac{C_0}{C} = 150\frac{4}{11} = 55 \text{ MHz}$$

$$BW_{CBSD} = \frac{B}{C} = \frac{150}{11} = 10 \text{ MHz}$$

Figure 8:
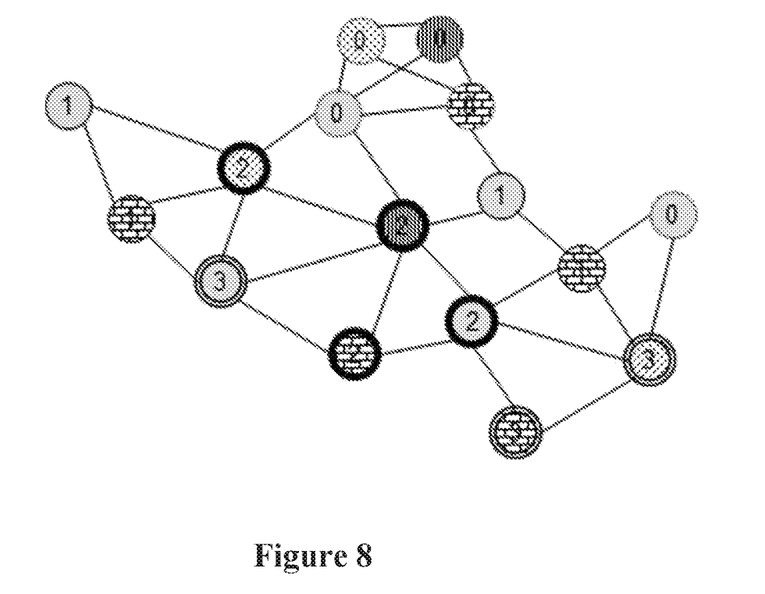
FIG. 8 illustrates an example of a connected set based on a classic method of coloring for allocating spectrum.

FIG. 8 illustrates another method of allocating spectrum in the current systems (i.e. prior art). In this example, there is no subgraph coloring based on CxGs, this method performs a global coloring, which ignores CxGs. The coloring is based on nodes solely. In FIG. 8, the colors are represented as different shades or background patterns. No two connected nodes have the same color. In this example, 4 colors are needed. As such, the bandwidth allocation to each CBSD/node is $$BW_{CBSD} = \frac{B}{C} = \frac{150}{4} = 35 \text{ MHz},$$

with B=150 MHz (as assumed) and C=4 (number of colors).

Comparing the results of method 300 applied to the example of FIG. 6 with FIG. 7 or 8, it can be clearly seen that method 300 achieves better results. For some nodes, method 300 can get 150 MHz to be assigned to the nodes and for the worst case, a node can get 35 MHz. This worst case can match the results from FIGS. 7 and 8. As such, the method 300 has advantages over the prior art.

Figure 9:
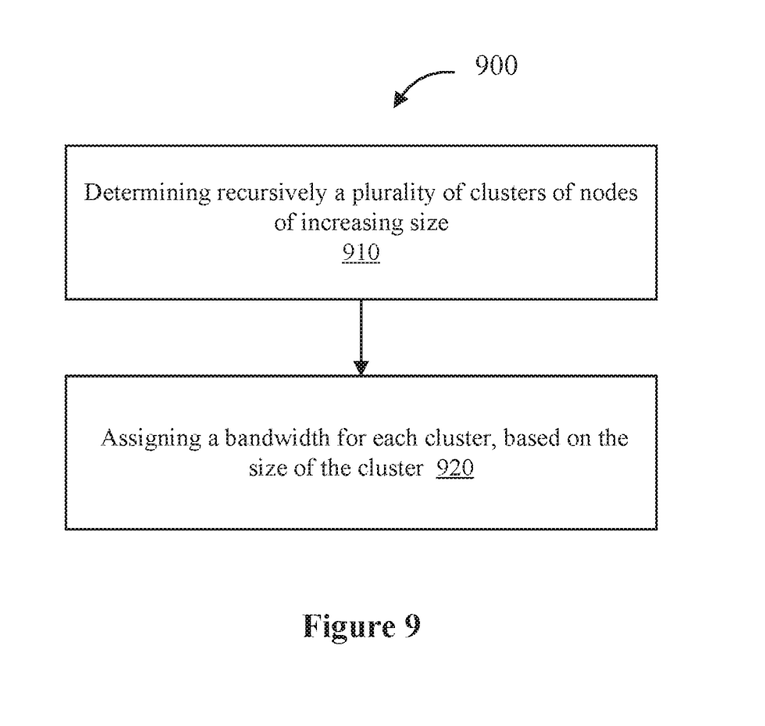
FIG. 9 illustrates a flow chart of a method for allocating spectrum, according to an embodiment.

FIG. 9 illustrates a method 900 for allocating or assigning bandwidth to clusters of nodes, according to some embodiments. Method 900 may generalize method 300.

The method 900 comprises:

Step 910: determining recursively a plurality of clusters of nodes of increasing size.

Step 920: assigning a bandwidth for each cluster, based on the size of the cluster.

For example, step 910 may include step 310, 320 and 330 of method 300.

In some embodiments, the plurality of clusters can comprise a number of groups of nodes.

In some embodiments, the size of the cluster of nodes can indicate the number of groups of nodes that the nodes in each cluster belong to, a group of nodes including one or more nodes connected to each other for which interference between the nodes is taken care of within the group. For example, the group of nodes can be a co-existence group (CxG).

In some embodiments, assigning the bandwidth to each cluster can comprise calculating a bandwidth B/k, wherein B is a total bandwidth and k is the size of the cluster.

In some embodiments, the method 900 may further divide the assigned bandwidth to nodes within a same group in a cluster.

In some embodiments, determining recursively the plurality of clusters of nodes may comprise starting to determine a cluster of nodes of size one.

In some embodiments, determining recursively the plurality of clusters of nodes may further comprise increasing the size of clusters and determining the clusters with the increased size until all nodes are associated with a cluster.

The method may be implemented in the controlling node. For example, the controlling node is a SAS.

Figure 10:
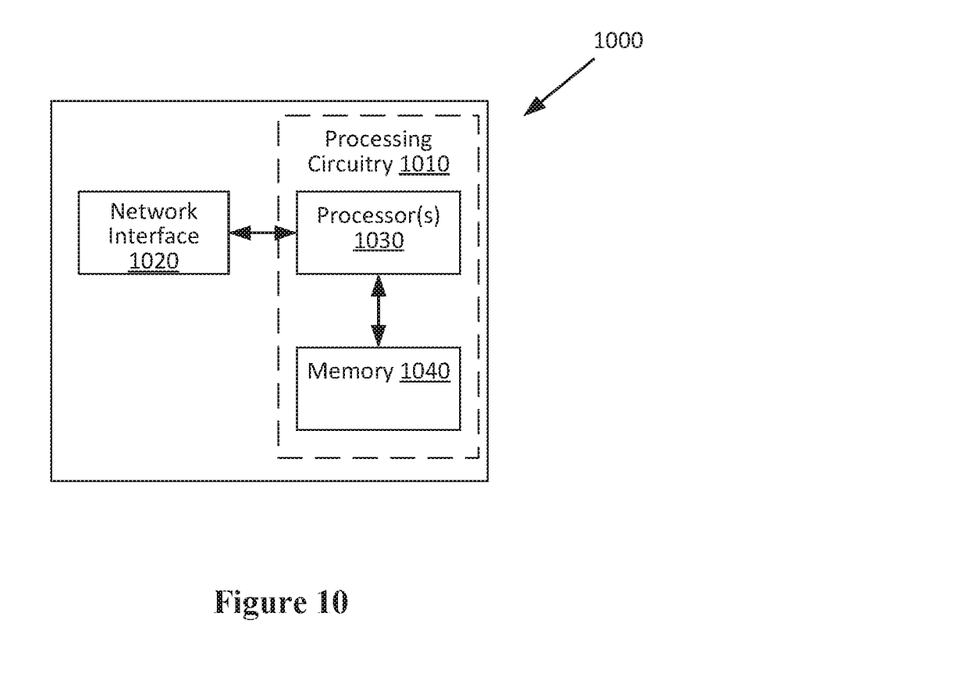
FIG. 10 is a schematic illustration of a controlling node, according to an embodiment.

FIG. 10 is a block diagram of an exemplary controlling node 1000, such as SAS1, that may be used to determine a channel assignment based on the factors discussed herein. The controlling node 1000 includes a processing circuitry 1010, and a network interface 1020. The circuitry 1010 may include one or more (node) processors 1030, and memory 1040. In some embodiments, the one or more processors 1030 executes the method 300 and 900 and all embodiments as described above. The memory 1040 stores the instructions for execution by the one or more processors 1030, and the network interface 1020 communicates signals to the other elements, such as the FCC databases, the CBSD, the ESC, the domain proxy, etc.

The one or more processors 1030 may include any suitable combination of hardware and software implemented in one or more modules to execute instructions and manipulate data to perform some or all of the described functions of the SAS, such as those described above. In some embodiments, the one or more processors 1030 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the one or more processors 1030 may comprise one or more of the modules discussed below with respect to FIG. 11.

The memory 1040 is generally operable to store instructions, such as a computer program, software, an application including one or more of logic, rules, algorithms, code, tables, etc. and/or other instructions capable of being executed by one or more processors 1030. Examples of memory 1040 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 1020 is communicatively coupled to the one or more processors 1030 and may refer to any suitable device operable to receive input for the controlling node 1000, send output from the controlling node 1000, perform suitable processing of the input or output or both, communicate to other devices, or any combination of the preceding. The network interface 1020 may include appropriate hardware (e.g., port, modem, network interface card, etc.) and software, including protocol conversion and data processing capabilities, to communicate through a network.

Other embodiments of the controlling node 1000 may include additional components beyond those shown in FIG. 10 that may be responsible for providing certain aspects of a SAS' functionality, including any of the functionality described above and/or any additional functionality (including any functionality necessary to support the solutions described above).

Processors, interfaces, and memory similar to those described with respect to FIG. 10 may be included in other network nodes. Other network nodes may optionally include or not include a wireless interface. Functionalities described could reside within the same node or could be distributed across a plurality of nodes and network nodes.

Figure 11:
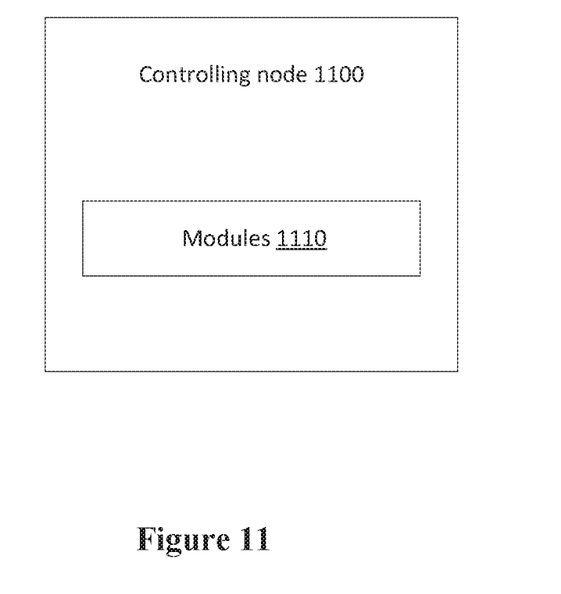
FIG. 11 is a schematic illustration of a controlling node, according to another embodiment.

FIG. 11 illustrates an example of a controlling node 1100 in accordance with another embodiment. The controlling node 1100 could be a SAS. The controlling node 1100 may include some modules 1110, such as a determining and an assigning module. The determining module is configured to perform at least step 910 of FIG. 9 and steps 310, 320 and 330 of FIG. 3. The assigning module is configured to perform at least steps 920 of method 900 and step 340 of method 300.

In certain embodiments, the determining module and the assigning module may be implemented using one or more processors, such as described with respect to FIG. 10. The modules may be integrated or separated in any manner suitable for performing the described functionality.

It should be noted that according to some embodiments, virtualized implementations of the controlling node of FIGS. 10 and 11 and of the CBSDs are possible. As used herein, a "virtualized" network node or controlling node (e.g., a virtualized base station or a virtualized radio access node or a SAS) is an implementation of the network node or controlling node in which at least a portion of the functionality of the network node/controlling node is implemented as a virtual component (e.g., via a virtual machine(s) or container(s) executing on a physical processing node(s) in a network(s)). As such, the functions of the controlling nodes 1000 and 1100 (described hereinabove) could be distributed across a cloud computing system.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any two or more embodiments described in this document may be combined in any way with each other.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components.

Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

Some of the abbreviations used in this disclosure include:
AAS Active Antenna System
ASA Authorized Shared Access
CBRS Citizen's Broadband Radio Service
CBSD Citizens Broadband radio Service Device
CxM Co-existence Manager
CxG—Co-existence Group
CSI-RS Channel State Information Reference Signal
ESC: Environmental Sensing Capability
eNB E-UTRAN NodeB
E-UTRAN Evolved UTRAN
UTRAN Universal Terrestrial Radio Access Network
GAA: General Authorized Access
ICIC Inter-cell interference coordination
ICG Interference coordination group
LSA Licensed Shared Access
PAL: Priority Access License
PPA: PAL Protection Area
RAT Radio Access Technology
RSRP Reference Signal Received Power
RSRQ Reference Signal Received Quality
RS-SINR Reference Signal SINR
RUV Relative User Value
SARUV Sum of Relative Average User Values
SAS Spectrum Access System
SINR Signal to Interference plus Noise Ratio
SLNR Signal leakage-to-noise ratio
UV User Value function
gNB Base station in NR
NR New Radio
WISPA Wireless Internet Service Provider Association

What is claimed is:

1. A method in a controlling node, the method comprising: determining recursively a plurality of clusters of nodes by recursively increasing a size of the clusters, starting with clusters of size one and determining clusters with the increased size until all nodes are associated with a cluster, wherein the plurality of clusters comprises a number of co-existence groups (CxGs) and wherein the size of a cluster of nodes indicates the number of CxGs, that the nodes in each cluster belong to, a CxG including one or more nodes connected to each other for which interference between the nodes is taken care of within the group; and
assigning a bandwidth to each cluster, based on the size of the cluster.

2. The method of claim 1, wherein assigning the bandwidth to each node in a cluster comprises calculating a bandwidth of B/k, wherein B is a total bandwidth and k is the size of the cluster.

3. The method of claim 2, further comprising dividing the assigned bandwidth to nodes within the same group inside a cluster.

4. A computer program product comprising a non-transitory computer readable storage medium having computer readable program code embodied in the medium, the computer readable program code comprising computer readable code to perform: determining recursively a plurality of clusters of nodes by recursively increasing a size of the clusters, starting with clusters of size one and determining clusters with the increased size until all nodes are associated with a cluster, wherein the plurality of clusters comprises a number of co-existence groups (CxGs) and wherein the size of a cluster of nodes indicates the number of CxGs, that the nodes in each cluster belong to, a CxG including one or more nodes connected to each other for which interference between the nodes is taken care of within the group; and assigning a bandwidth to each cluster, based on the size of the cluster.

5. A non-transitory computer readable memory configured to store executable instructions for a controlling node, the executable instructions when executed by one or more processors cause the controlling node to perform: determining recursively a plurality of clusters of nodes by recursively increasing a size of the clusters, starting with clusters of size one and determining clusters with the increased size until all nodes are associated with a cluster, wherein the plurality of clusters comprises a number of co-existence groups (CxGs) and wherein the size of a cluster of nodes indicates the number of CxGs, that the nodes in each cluster belong to, a CxG including one or more nodes connected to each other for which interference between the nodes is taken care of within the group; and assigning a bandwidth to each cluster, based on the size of the cluster.

6. A controlling node comprising a processing circuitry, the processing circuitry comprising a memory and a processor connected thereto, the memory containing instructions that, when executed, cause the processor to:
determine recursively a plurality of clusters of nodes by recursively increasing a size of the clusters, starting with clusters of size one and determining clusters with the increased size until all nodes are associated with a cluster, wherein the plurality of clusters comprises a number of co-existence groups (CxGs) and wherein the size of a cluster of nodes indicates the number of CxGs, that the nodes in each cluster belong to, a CxG including one or more nodes connected to each other for which interference between the nodes is taken care of within the group; and
assign a bandwidth to each cluster, based on the size of the cluster.

7. The controlling node of claim 6, wherein the processor is configured to assign the bandwidth to each cluster by calculating a bandwidth of B/k, wherein B is a total bandwidth and k is the size of the cluster.

8. The controlling node of claim 7, wherein the processor is configured to divide the assigned bandwidth to nodes within a same group in a cluster.

9. The controlling node of claim 6, wherein the controlling node is a Spectrum Access System (SAS).

\* \* \* \* \*